United States Patent

[11] 3,559,711

| [72] | Inventor | Wilhelm Schelkmann |
| --- | --- | --- |
| | | Witten(Ruhr), Germany |
| [21] | Appl. No. | 754,565 |
| [22] | Filed | Aug. 22, 1968 |
| [45] | Patented | Feb. 2, 1971 |
| [73] | Assignee | Vakuum Vulk Holdings Ltd |
| | | Nassau, Bahamas |
| | | a corporation of Bahama by mesne assignment to |
| [32] | Priority | Sept. 5, 1967 |
| [33] | | Germany |
| [31] | | Sch 43313 |

[54] TREAD STRIP
7 Claims, 2 Drawing Figs.

[52] U.S. Cl............................................ 152/209, 152/176
[51] Int. Cl........................................... B60c 11/12
[50] Field of Search............................... 152/209, 176, 187

[56] References Cited
UNITED STATES PATENTS

| 1,917,261 | 7/1933 | Hawkinson | 152/209 |
| --- | --- | --- | --- |
| 2,424,608 | 7/1947 | French | 152/209 |
| 3,094,157 | 6/1963 | Klohn | 152/209 |
| 3,405,753 | 10/1968 | Verdier | 152/209 |

*Primary Examiner*—James B. Marbert
*Attorney*—Michael S. Striker

ABSTRACT: A tread strip for recapping of tires comprises an elongated strip member having a first face which is adapted to be affixed to the circumferential surface of a tire, and a second face. The second face is provided therein with a plurality of transversely adjacent longitudinally extending undulating grooves each of which has a plurality of portions at which it changes its direction of undulation. The grooves are wider in the region of these portions than intermediate such portions.

PATENTED FEB 2 1971 3,559,711

INVENTOR
Wilhelm Schollemann
BY
Michael S. Striker
ATTORNEY

TREAD STRIP

BACKGROUND OF THE INVENTION

The present invention relates to a tread strip for affixing to the circumferential surface of a vehicle tire, and more particularly to a tread strip for recapping vehicle tires.

It is known to tread a tire carcass, whether it be new or used, that is to be retreaded in the latter case, by providing elongated tread strips a first face of which is to be affixed as by vulcanizing to the circumferential surface of the tire to be so threaded, and the second or outer face of which is provided with the tread profile. Of course, the tire surface to which such a tread strip must be affixed is curved circumferentially of the tire as well as in direction transverse to its circumference. In other words, it has in a plane of symmetry of the tire which is normal to the tire axis a circumference having a greater length than the circumference of the tire at opposite sides of such plane. As a result, when such a tread strip is wrapped around the outer tire surface, the central portion of the tread strip will extend over a portion of the outer tire surface having a greater circumferential length than the side portions and, therefore, the central tread portion must be expanded and/or the side portions of the strip must be contracted to compensate for the difference in the circumferential length of the outer tire surface. This of course creates stresses in the tread strip. To overcome this problem it is known to provide the underside of the strip member, that is the side which is to be affixed to the circumferential surface of the tire, with incisions, recesses, and/or folds which, depending upon their location, will open or close for the purpose of compensating for the differences in the circumferential length of the outer tire surface which is to be covered.

While this approach is by no means without value, it has nevertheless been found that further improvements with respect to the problem at hand are desirable.

It is accordingly, an object of the present invention to simplify the manufacture of elongated tread strip members as well as to enhance or improve their ability to accommodate themselves to the different circumferential dimensions of the outer tire surface to which they are to be affixed.

A further object of the present invention is to provide tread strip members of the tube under discussion wherein the development of vibrations resulting from rolling movement of a tire to which the tread strip member is affixed, that is rolling movement as a result of motion of the vehicle, is counteracted.

SUMMARY OF THE INVENTION

In accordance with the above objects, and others which will become apparent hereafter, one feature of my invention resides in the provision of a tread strip which is to be affixed to the circumferential surface of a vehicle tire, particularly for the purpose of recapping such a tire but also for the purpose of providing a new tire carcass with a tread. In either case my novel tread strip will comprise an elongated strip member having a first face adapted to be affixed to the circumferential surface of the tire, and a second face. The second face is provided with a plurality of transversely adjacent longitudinally extending undulating grooves and, in accordance with my invention, each of these grooves has a plurality of portions at which it changes its direction of undulation, and is wider in the region of these portions than intermediate the same.

By this measure I assure that in the wider regions the strip member is more readily longitudinally extensible at the center portion thereof which will overlie the center of the circumferential tire surface or the circumferential length of this surface is greatest. On the other hand, and again as a direct result of this measure, the marginal portions of the strip member which will overlie the lateral portions of the circumferential tire surface where the circumferential length of the tire surface is less than at the center portion, will more readily undergo the contractions necessary to compensate for the difference in circumferential length between the lateral portions of the circumferential tire surface and the center portion thereof.

Advantageously, my grooves will be of zigzag shape and will outline substantially equilateral triangles, each such triangle being outlined between three consecutive points or portions at which a groove reverses its direction of undulation. The tip of one triangle will face the base of a triangle outlined by a laterally adjacent groove. In accordance with my invention the thickness of the strip member may decrease in the marginal zones thereof towards the lateral edges, and intermediate the portions of direction reversal in the grooves located in these marginal zones the second face will be provided with channels or incisions extending transversely of the direction of elongation of the strip member and to the lateral edges at which they are open. This is a further measure to accommodate the necessary contraction of the marginal portions of the strip.

To suppress or at least reduce the unavoidable vibrations which occur when a tire rolls over a surface when the vehicle on which it is provided is in use, the grooves are asymmetrical, both with respect to the longitudinal extension of the strip member and to the transverse extension thereof. This can for instance be accomplished by having the triangles outlined by the respective laterally adjacent grooves include different angles, that is triangles outlined by one groove will include one angle and the triangles included by an adjacent group will include another angle. As far as the longitudinal extension is concerned, the triangles at one side of a given groove may be different from the triangles at the other side of the same groove, and the triangles at the other side of the same groove, and the triangles of any groove may nonperiodically decrease in their steepness or increase. In other words, three or five consecutive triangles may increase in steepness and this may be repeated a few times but not periodically, that is after a repetition of three or four times only two triangles may now increase in steepness, or five or six thereof. The point is that this irregularity is provided for the purpose of preventing the development of uniform vibrations which could serve to reinforce one another until they would arrive at an objectionable level.

Further, the second face of the strip member may be provided intermediate the adjacent grooves with incisions whose depth approximates the depth of the respective grooves, and these incisions may be of undulatory configuration, where by the quality of the strip member to conform itself to the configuration of the outer circumferential tire surface is further enhanced. Also, the individual grooves may be connected by open channels for the same purpose.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
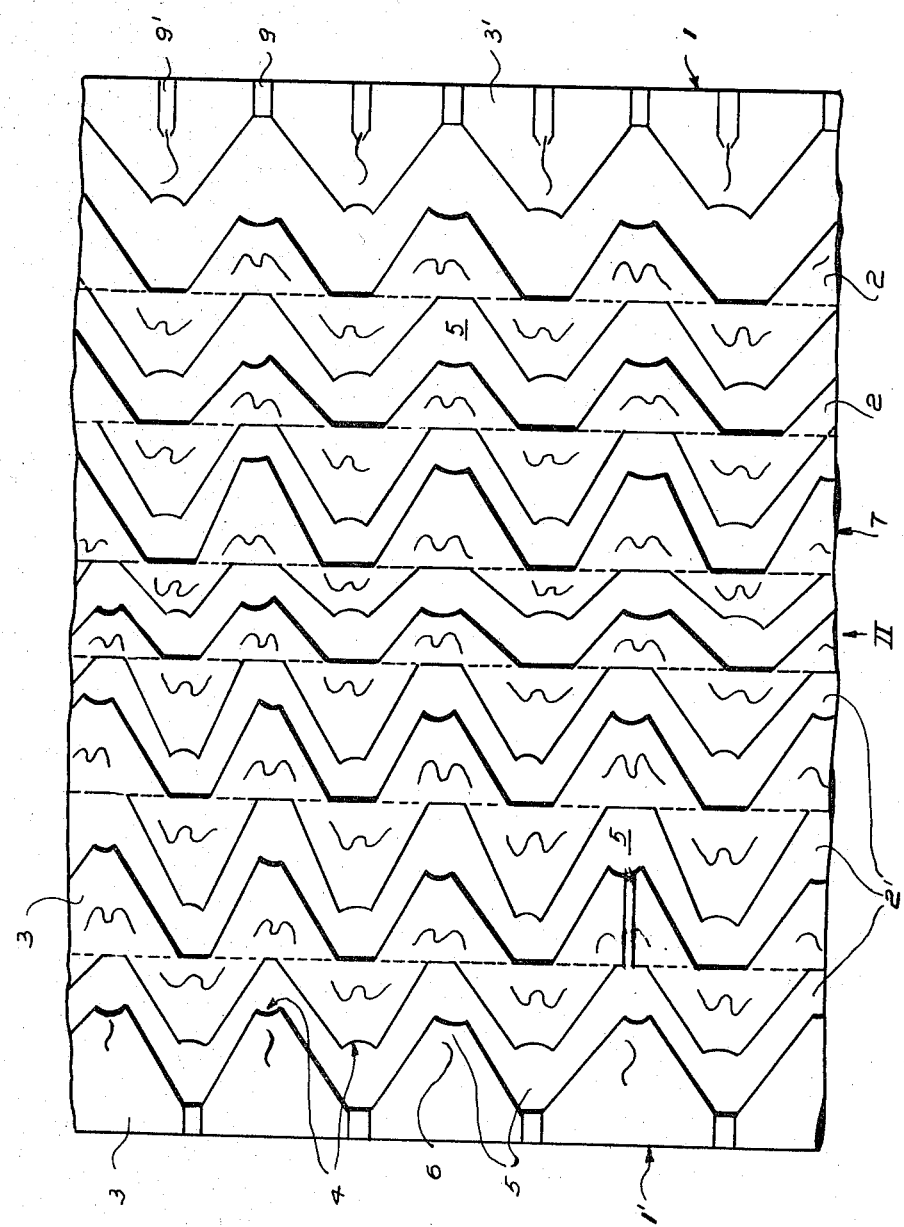
FIG. 1 is a plan view of a portion of a strip member incorporating the invention.

Discussing now the drawing in detail it will be seen that the illustrated portion of an elongated strip member embodying my invention has two lateral edges 1 and 1', respectively. From this it follows that the strip member is elongated in a direction parallel to these edges 1 and 1'. I have illustrated the aforementioned second face, that is that face of the strip member which will not be affixed to the circumferential tire surface but rather which is provided with the tread profile. This profile is identified with reference numeral 2 and comprises a plurality of longitudinally extending substantially zigzag-shaped strip-portions which define between themselves a similar plurality of longitudinally extending undulating substantially zigzag-shaped grooves 2'. In the illustrated embodiment these grooves 2' each outline a plurality of triangles 3 which are offset longitudinally with reference to one another so that the tip of each triangle in one groove faces the base of a triangle in an adjacent groove.

It will be seen that each triangle is provided by the reversal of direction of undulation of a groove 2' at three successive portions of the groove. In accordance with my invention these grooves are wider in the region of these portions where the direction reversal occurs than intermediate these portions. This is accomplished in the present embodiment by removing material at the tips 4 of the solid strips located intermediate the grooves 2', and these wider portions thus obtained are identified with reference numeral 5.

The "second face," that is the material of the strip member intermediate the grooves 2', is provided with undulatory incisions 6 whose depth may approximate the depth of the grooves 2' whereby the ability of the strip member to conform itself to the circumferential tire surface is further enhanced.

It will be appreciated that the asymmetrical configuration of the profiles is somewhat exaggerated, the difference 7 in the size of the outlined triangles 3 having been shown larger than in actuality.

Figure 2:
FIG. 2 is an elevational view as seen in the direction of the arrow II associated with FIG. 1.

FIG. 2 shows clearly that the marginal zones taper in thickness towards the edges 1 and 1', respectively. As FIG. 1 illustrates, the strip member is provided intermediate the direction-reversing portions of the grooves 2' located in these marginal zones, that is in the region of the triangles 3' outlined by these grooves 2', with further incisions or slots 9' which extend in the respective marginal portions to the lateral edge 1 or 1' at which these incisions or slots have open ends. As also shown in FIG. 1, the incisions or slots may also be provided in the region of the direction-reversing portions of the respective grooves in the marginal portions, this being identified with reference numeral 9. The purpose of these slots 9, 9' is of course to assure still further enhancement in the ability of the strip member to compensate for the differential in the circumferential length of the outer circumferential surface of the vehicle tire, as compared between the lateral portions of the surface and the center portion thereof.

Conventionally, the strip member illustrated will be constructed of a suitable elastomeric material, such as natural or synthetic rubber, or the like. However, the particular material used does not constitute a part of my invention.

Without further analysis, the foregoing will so fully reveal the gist of the present invention that others can by applying current knowledge readily adapt it for various applications without omitting features that, form the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended

I claim:

1. A tread strip for affixing to the circumferential surface of a vehicle tire, particularly for recapping such a tire, comprising an elongated strip member having a first face adapted to be affixed to said surface, and a second face; and a plurality of transversely adjacent longitudinally extending undulating grooves provided in said second face, each of said grooves having a plurality of portions at which it changes its direction of undulation and being wider in the region of said portions than intermediate the latter, said grooves each outlining a plurality of substantially equilateral triangles and adjacent grooves being longitudinally offset relative to one another so that the bases of the triangles of one groove are juxtaposed with the tips of the triangles of an adjacent groove, and vice versa.

2. A tread strip as defined in claim 1, wherein said grooves are of substantially zigzag-shaped configuration.

3. In a tread strip as defined in claim 1, said strip member having a longitudinal and a transverse extension and said grooves being asymmetrical with respect to at least one such extension.

4. In a tread strip as defined in claim 3, said grooves being asymmetrical also with respect to the other of said extensions.

5. In a tread strip as defined in claim 1, said grooves having a predetermined depth; and wherein said strip member is provided in said second face and intermediate said grooves with undulatory incisions having a depth approximating said predetermined depth.

6. A tread strip for affixing to the circumferential surface of a vehicle tire, particularly for recapping such a tire, comprising an elongated strip member having a first face adapted to be affixed to said surface, a second face, and lateral marginal zones tapering in thickness outwardly away from one another and provided with lateral edges extending along the respective marginal zones; a plurality of transversely adjacent longitudinally extending undulating grooves in said second face including said marginal zones, each of said grooves having a plurality of portions at which it changes its direction of undulation and being wider in the region of said portions than intermediate the same; and recesses in said second face within said marginal zones intermediate said portions and extending transversely to the elongation of the strip member and to the respective lateral edge.

7. A tread strip as defined in claim 6, wherein said recesses are slots.